(12) United States Patent
Li et al.

(10) Patent No.: US 9,411,199 B2
(45) Date of Patent: Aug. 9, 2016

(54) ARRAY SUBSTRATE AND COLOR FILTER SUBSTRATE OF DISPLAY DEVICE AND METHOD FOR MANUFACTURING THE SAME

(71) Applicant: BEIJING BOE OPTOELECTRONICS TECHNOLOGY CO., LTD., Beijing (CN)

(72) Inventors: Cheng Li, Beijing (CN); Xue Dong, Beijing (CN); Dong Chen, Beijing (CN); Suzhen Mu, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 140 days.

(21) Appl. No.: 13/805,149

(22) PCT Filed: Sep. 29, 2012

(86) PCT No.: PCT/CN2012/082446
§ 371 (c)(1),
(2) Date: Dec. 18, 2012

(87) PCT Pub. No.: WO2013/060222
PCT Pub. Date: May 2, 2013

(65) Prior Publication Data
US 2013/0105831 A1    May 2, 2013

(30) Foreign Application Priority Data
Oct. 24, 2011 (CN) .......................... 2011 1 0327982

(51) Int. Cl.
*G02F 1/1343* (2006.01)
*G02F 1/1362* (2006.01)

(52) U.S. Cl.
CPC .... *G02F 1/134309* (2013.01); *G02F 1/136286* (2013.01); *G02F 2001/134318* (2013.01); *G02F 2001/134372* (2013.01); *G02F 2201/40* (2013.01)

(58) Field of Classification Search
CPC .............. G02F 2001/134372; G02F 1/134309; G02F 1/136286
USPC ......................................................... 349/141
See application file for complete search history.

(56) References Cited

U.S. PATENT DOCUMENTS

| 6,259,493 B1 | 7/2001 | Nakamura et al. |
| 6,449,026 B1 * | 9/2002 | Min et al. ...................... 349/141 |

(Continued)

FOREIGN PATENT DOCUMENTS

| CN | 101078841 A | 11/2007 |
| CN | 101174638 A | 5/2008 |

(Continued)

OTHER PUBLICATIONS

International Search Report: dated Oct. 24, 2011; PCT/CN2012/082446.

(Continued)

*Primary Examiner* — James Dudek
(74) *Attorney, Agent, or Firm* — Ladas & Parry LLP

(57) ABSTRACT

Embodiments of the present invention discloses an array substrate of display device and a method for manufacturing the same, which can effectively restrain the interference by the signals over data lines with the modulation conducted by liquid crystal thereon, and improve light transmittance. The array substrate comprises: a pixel region defined by a gate line intersecting a data line. A thin film transistor, a pixel electrode, and a common electrode, which cooperates with the pixel electrode to form a multi-dimension electric field, are disposed in the pixel region. The pixel electrode is a slit-shaped electrode, and the common electrode is a plate-shaped electrode; or the pixel electrode is a plate-shaped electrode, and the common electrode is a slit-shaped electrode. An end of the plate-shaped electrode covers the data line, and a second insulating layer is disposed between a layer of the plate-shaped electrode and a layer of the data line.

3 Claims, 2 Drawing Sheets

(56) References Cited

U.S. PATENT DOCUMENTS

| | | | |
|---|---|---|---|
| 8,233,125 B2 * | 7/2012 | Yuh et al. | 349/141 |
| 2002/0101557 A1 * | 8/2002 | Ono et al. | 349/143 |
| 2002/0159016 A1 | 10/2002 | Nishida et al. | |
| 2004/0227891 A1 | 11/2004 | Hirota | |
| 2006/0279677 A1 | 12/2006 | Matsushima | |
| 2006/0285045 A1 | 12/2006 | Nishikawa et al. | |
| 2007/0024789 A1 * | 2/2007 | Itou | G02F 1/134363 349/139 |
| 2007/0171319 A1 * | 7/2007 | Fujita | G02F 1/134309 349/43 |
| 2007/0242204 A1 | 10/2007 | Fujita et al. | |
| 2007/0268440 A1 | 11/2007 | Nagano | |
| 2009/0109358 A1 | 4/2009 | Tanaka et al. | |
| 2011/0037931 A1 | 2/2011 | Im et al. | |
| 2011/0075085 A1 | 3/2011 | Park | |
| 2011/0216278 A1 | 9/2011 | Nagano et al. | |
| 2011/0228189 A1 | 9/2011 | Oh et al. | |
| 2012/0176561 A1 * | 7/2012 | Kim et al. | 349/46 |
| 2012/0182490 A1 | 7/2012 | Kim et al. | |
| 2013/0105831 A1 | 5/2013 | Li et al. | |

FOREIGN PATENT DOCUMENTS

| | | |
|---|---|---|
| CN | 101424834 A | 5/2009 |
| CN | 102033369 A | 4/2011 |
| CN | 102156369 A | 8/2011 |
| CN | 102629055 A | 8/2012 |
| JP | 2001-194671 A | 7/2001 |
| JP | 2007-226175 A | 9/2007 |
| JP | 2009-103867 A | 5/2009 |
| JP | 2009-109820 A | 5/2009 |
| JP | 2010-108963 A | 5/2010 |
| KR | 20000005852 A | 1/2000 |
| KR | 20060128727 A | 12/2006 |
| KR | 20070078389 A | 7/2007 |
| KR | 20070093899 A | 9/2007 |
| KR | 20090045042 A | 5/2009 |

OTHER PUBLICATIONS

First Chinese Office Action dated Nov. 1, 2013; Appln. No. 201110327982.1.

Korean Examination Opinion dated Jul. 31, 2014; Appln. No. 10-2012-7030809.

Extended European Search Report dated Nov. 5, 2015; Appln. No. 12780626.3-1904/2775345; PCT/CN2012082446.

Korean Examination Opinion dated Mar. 30, 2015; Appln. No. 10-2012-7030809.

Korean Examination Opinion dated May 20, 2015; Appln. No. 10-2012-7030809.

Second Chinese Office Action dated May 4, 2014; Appln. No. 201110327982.1.

Korea Office Action dated Jan. 28, 2014; Appln. No. 10-2012-7030809.

International Preliminary Report on Patentability dated Apr. 29, 2014; PCT/CN2012/082446.

Japanese Office Action dated Apr. 21, 2016; Appln. No. 2014-536102.

* cited by examiner

ARRAY SUBSTRATE AND COLOR FILTER SUBSTRATE OF DISPLAY DEVICE AND METHOD FOR MANUFACTURING THE SAME

TECHNICAL FIELD

Embodiments of present invention relate to an array substrate and a color filter substrate of a liquid crystal display (LCD) and a method for manufacturing the same.

BACKGROUND

In flat panel display technology, LCDs have the advantages such as small volume, low power consumption, little radiation, lower costs, etc., and therefore have prevailed in the current flat panel display market.

In an Advanced-Super Dimensional Switching (ADS) technology, a multi-dimensional electric field is formed with both an electric field produced at edges of slit electrodes on the same plane and an electric field produced between a pixel electrode layer and a common electrode layer, so that liquid crystal molecules at all orientations, which are located directly above the electrodes and between the slit electrodes in a liquid crystal cell, can be rotated and aligned, which enhances the work efficiency of planar-oriented liquid crystals and increases light transmittance. The Advanced-Super Dimensional Switching technology can improve the picture quality of TFT-LCDs and has advantages such as high transmissivity, wide viewing angles, high opening ratio, low chromatic aberration, low response time, no push Mura, etc.

In the existing ADS mode LCDs, common electrodes and pixel electrodes are made of a transparent conductor so as to increase aperture ratio and transmittance. The space between the common electrodes and the pixel electrodes is narrower than the space between an upper substrate and a lower substrate, so the multi-dimension electric field formed between the common electrodes and the pixel electrodes make liquid crystal molecules rotated in a plane direction paralleling to substrates, and thus the transmission efficiency is improved.

In order to prevent light blocking regions above data lines from reducing the aperture ratio and improve transmittance, as shown in FIG. 1, the prior art provides a pixel structure in which the light blocking region above the data line 1 is removed and the slit-shaped common electrode 2 is disposed in parallel with the data line 1. A portion of the slit-shaped common electrode 2 is disposed above the pixel electrode 3, and the other portion of the slit-shaped common electrode 2 covers the data line 1 and has a width larger than that of the data line 1. Since the common electrode 2 is formed above the data line 1, the interference with the electric field for liquid crystal can be restrained, disadvantageous effects such as light leakage and the like are prevented, and the transmittance of pixels are improved.

However, the inventors have noted that: in the above pixel structure, the wide common electrode above the data line still causes transmittance loss at the location of the data line.

SUMMARY OF THE INVENTION

One of the problems to be solved by the present invention is to provide an array substrate and a color filter substrate of a display device and a method for manufacturing the same, for effectively restraining signals over data lines from interfering with modulation by liquid crystal thereon and improving light transmittance.

An aspect of the present invention provides an array substrate comprising: a base substrate, a gate line disposed on the base substrate, a data line disposed perpendicular to the gate line, and a pixel region defined by the gate line intersecting the data line, in which a thin film transistor, a pixel electrode, and a common electrode which cooperates with the pixel electrodes to form a multi-dimension electric field are disposed, wherein the pixel electrode is a slit-shaped electrode and the common electrode is a plate-shaped electrode, or the pixel electrode is a plate-shaped electrode and the common electrode is a slit-shaped electrode, and a first insulating layer is disposed between the common electrode and the pixel electrode, and wherein an end of the plate-shaped electrode covers the data line, and a second insulating layer is disposed between a layer of the plate-shaped electrode and a layer of the data line.

For example, the second insulating layer is a resin layer.

For example, the slit-shaped electrode comprises slits arranged in a constant interval.

Another aspect of the present invention provides a method for manufacturing an array substrate, comprising:

forming a gate line, a date line, and a thin film transistor on a base substrate, a gate electrode of the thin film transistor being connected to the gate line, and source electrodes being connected to the data line;

forming a second insulating layer on the base substrate on which the gate line, the data line, and the thin film transistor are formed;

forming a plate-shaped electrode on the base substrate on which the second insulating layer is formed; and forming a slit-shaped electrode on the base substrate on which the plate-shaped electrode is formed, the slit-shaped electrode cooperating with the plate-shaped electrode to form a multi-dimension electric field, a first insulating layer being disposed between the slit-shaped electrode and the plate-shaped electrode;

wherein the slit-shaped electrode is a pixel electrode and the plate-shaped electrode is a common electrode, or the plate-shaped electrode is a pixel electrode and the slit-shaped electrode is a common electrode, and an end of the plate-shaped electrode covers the data line.

For example, the second insulating layer is a resin layer.

For example, the slit-shaped electrode comprises slits arranged in a constant interval.

Another aspect of the present invention provides a color filter substrate comprising: a base substrate, black matrixes and color resin formed between the black matrixes, on the base substrate, the black matrixes are disposed corresponding to the gate lines, the thin film transistors, and regions where the data lines are not formed and between adjacent pixels, of the array substrate.

Another aspect of the present invention provides a display device comprising the above array substrate.

In the technical solutions of embodiments of the present invention, an end of the plate-shaped electrode is located above and covers the data line, and a second insulating layer is disposed between a layer of the plate-shaped electrode and a layer of the data line for insulation and protection. The solutions of the present embodiments not only restrain the interference by the data lines with the modulation conducted by the liquid crystal thereon, but also increase the area of the multi-dimension electric field, increase the modulation range of the liquid crystal in pixels, and improve transmittance.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

| Reference Number | | |
|---|---|---|
| 1   data line; | 2   common electrode; | 3   pixel electrode; |
| 4   base substrate; | 5   first insulating layer; | 6   second insulating layer; |
| 7   base substrate; | 8   black matrix; | 9   color resin sheet; |
| 10  liquid crystal layer; | 21  slit; | 100 color filter substrate; |
| 200 array substrate. | | |

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention provide an array substrate and a color filter substrate of a display device, and a method for manufacturing the same, for effectively restraining the interference by signals over data lines with the modulation conducted by liquid crystal thereon and improving light transmittance.

The array substrate of the embodiment of the present invention includes a plurality of gate lines and a plurality of data lines which intersect each other to define pixel regions arranged in a matrix, each pixel region comprising a thin film transistor as a switch element, and a pixel electrode and a common electrode for controlling orientation of liquid crystal. A gate electrode of the thin film transistor in each pixel is electrically connected to or integrally formed with a corresponding gate line, a source electrode thereof is connected to or integrally formed with a corresponding data line, and a drain electrode thereof is connected to or integrally formed with a corresponding pixel electrode. The following description is mainly connected with one or more pixel regions, but other pixel regions can be formed similarly.

First Embodiment

Figure 2:
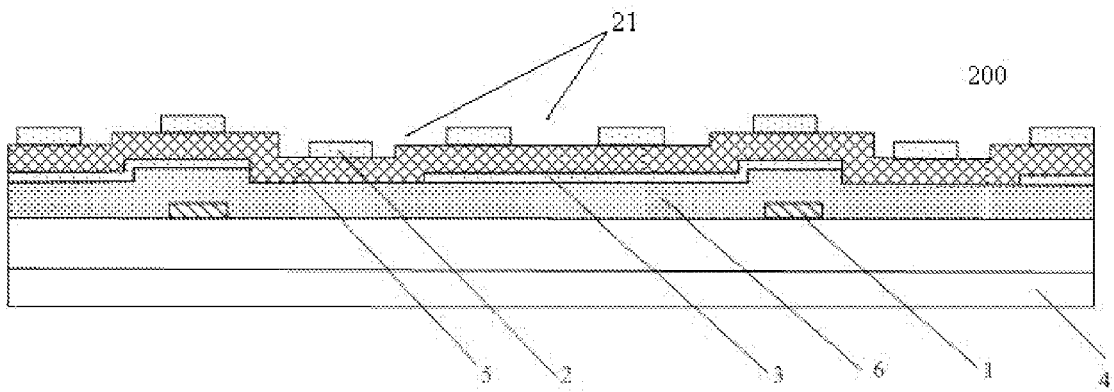
FIG. 2 is a schematic cross-sectional view of an array substrate in an embodiment of the present invention.

The first embodiment of the present invention provides an array substrate, as shown in FIG. 2. The array substrate 100 includes a base substrate 4, gate lines (not shown in drawings) disposed on the base substrate 4, and data lines 1 perpendicular to the gate lines. The gate lines intersect the data lines 1 to define a plurality of pixel regions. A thin film transistor (not shown), a pixel electrode 3, and a common electrode 2 for cooperating with the pixel electrode 3 to generate a multi-dimension electric field are disposed in each pixel region. In the embodiment, the pixel electrode 3 is a plate-shaped electrode without slits, and the common electrode 2 is a slit-shaped electrode in which a plurality of slits 21 are formed. A first insulating layer 5 is disposed between the common electrode 2 and the pixel electrode 3. An end of the plate-shaped pixel electrode 3 is located above and covers the data line 1, and a second insulating layer 6 is disposed between a layer of the pixel electrode 3 and a layer of the data line 1.

In a conventional pixel structure, the pixel electrode does not overlap the data line. Because, in an overlapping design in which the pixel electrode overlaps the data line, the data line interferes with the pixel electrode to a large extent. Thus, if the overlapping design is adopted, to avoid the interference of the data line with the pixel electrode, an insulating layer of resin material is generally used, that is, a resin layer is disposed between a layer of the pixel electrode 3 and a layer of the data line 1 so as to isolate them from each other.

Figure 1:
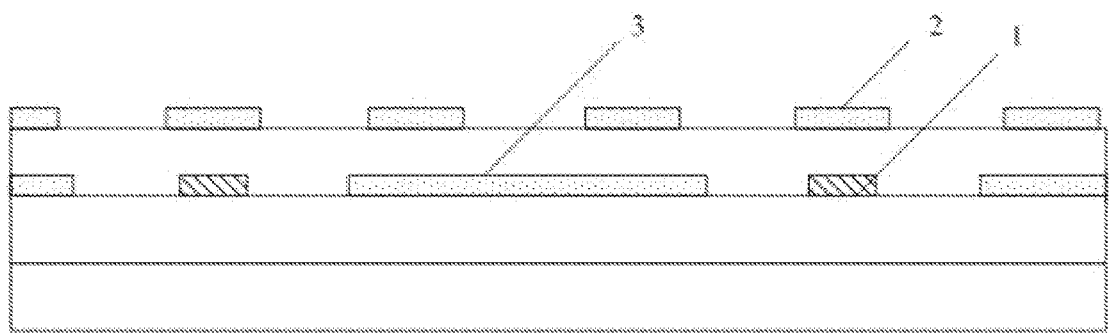
FIG. 1 is a schematic cross-sectional view of an array substrate in prior art.

Since the common electrode entirely covers the data line so that the common electrode occupies a wide area over the data line in the prior art scheme as shown in FIG. 1, this structure causes transmittance loss at the location of the data line. In contrast, in the array substrate of the present embodiment, an end of the pixel electrode is located above and covers the data line (the common electrode is also above the data line), and an insulating layer is disposed between the layer of the pixel electrode and the layer of the data line for insulation and protection. In this way, the interference by the data lines with the modulation by the liquid crystal thereon is restrained, the area of the multi-dimension electric field is also increased, the modulation range of the liquid crystal in pixels is increased, and transmittance is further improved.

Further, the second insulating layer 6 is, for example, a resin layer, formed to prevent the data line from interfering with the pixel electrode, that is, a resin layer is disposed between the layer of the pixel electrode 3 and the layer of the data line 1. For example, the common electrodes 2 are arranged in a constant interval, and within pixels, the slit-shaped or plate-shaped common electrode has an arrangement of a constant interval. It should be noted that: since the pixel electrode covers the data line, the loads over the data line will not be affected no matter whether the common electrode overlaps the data line or not. The effect by the loads over the data line is mainly resulted from a capacitor formed between the data line and the pixel electrode, which can be alleviated by a thicker resin material layer as the insulating layer. In the solution of the present invention, a multi-dimension electric field is formed by the plate-shaped pixel electrode at a lower side and the slit-shaped common electrode at the upper side, and the upper common electrode is isolated from the lower pixel electrode by the insulating layer, that is, the first insulating layer; an end of the pixel electrode covers the data line, and a resin layer, i.e., the second insulating layer is disposed between the layer of the pixel electrode and the layer of the data line, for insulation and protection. The solution of the present embodiment not only restrains the data lines from interfering with the modulation by the liquid crystal thereon, but also increases the area of the multi-dimension electric field, increases the modulation range of the liquid crystal within pixels, and further improves transmittance.

Second Embodiment

The second embodiment is different from the first embodiment in that: the common electrode is a plate-shaped electrode, and the pixel electrode is a slit-shaped electrode; an end of the plate-shaped common electrode is located above and covers the data line, and the second insulating layer is disposed between the common electrode and the data line; the slit-shaped pixel electrode is formed on the common electrode, and the first insulating layer is disposed between the pixel electrode and the common electrode.

Therefore, in the array substrate of the present embodiment, an end of the common electrode is located above and covers the data line (the pixel electrode is also above the data line), and an insulating layer is disposed between the common electrode and the data line for insulation and protection. In this way, the interference by the data lines with the modulation by the liquid crystal thereon is restrained, the area of the multi-dimension electric field is increased, the modulation range of the liquid crystal in pixels is also increased, and transmittance is further improved.

Third Embodiment

Figure 3:
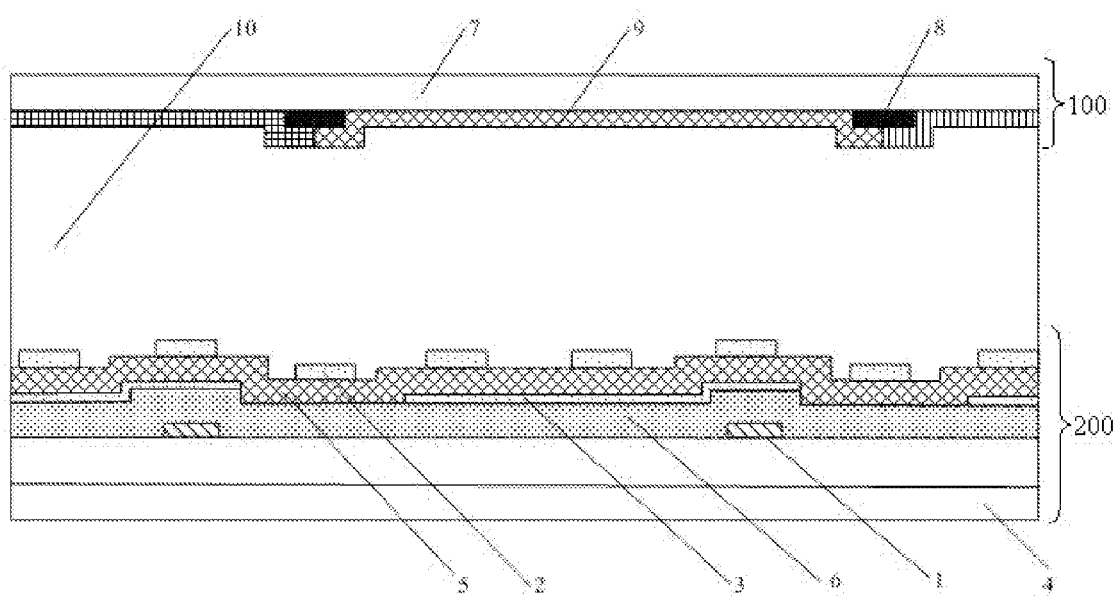
FIG. 3 is a schematic cross-sectional view of a liquid crystal panel in an embodiment of the present invention.

The embodiment of the present invention also provides a liquid crystal panel. As shown in FIG. 3, a liquid crystal panel according to an example of the embodiment includes a color filter substrate 100, the array substrate 200 of the first embodiment, and a liquid crystal layer 10 between the array substrate 200 and the color filter substrate 100.

The color filter substrate 100 includes: a base substrate 7, black matrixes 8 formed on the base substrate 7, and color resin sheets 9 formed between the black matrixes 8, the black matrixes 8 are disposed at positions corresponding to gate lines, thin film transistors, and a region without data lines and between adjacent pixels on the array substrate 200. The black matrixes 8 of the color filter substrate define a plurality of sub-pixel regions, each sub-pixel region includes a color resin sheet 9 such as a red, green, and blue resin sheet, and therefore red, green, and blue (RGB) sub-pixels are formed. The sub-pixel regions of the color filter substrate 100 correspond to the sub-pixel regions of the array substrate 200.

The array substrate 200 is disposed to face the color filter substrate so as to form a liquid crystal cell together. The liquid crystal cell is filled with liquid crystal material to form a liquid crystal layer 10. Thus, a liquid crystal panel is obtained. The pixel electrode and the common electrode of each pixel region apply an electric field to the liquid crystal material to control the degree of rotation of the liquid crystal, thereby performing displaying operation. In some examples, the liquid crystal display further includes a backlight source for supplying light to the liquid crystal panel.

In the array substrate as shown in FIG. 1, the common electrode in a wider structure is disposed above the data line 1, thus the region covered by the common electrode does not transmit light. However, in the array substrate 200 of the present embodiment, since the pixel electrode 3 is disposed above and covers the data line 1, only the region that is immediately above the data line 1 does not transmit light. In this way, the interference by signals of the data line 1 with the electric field for liquid crystal can be eliminated, and the range of liquid crystal modulation is increased. Meanwhile, since the liquid crystal corresponding to the portion of the pixel electrode 3 that is overlapped with the data line 1 can be driven normally, it is unnecessary to dispose black matrixes 8 on the color filter substrate at positions corresponding to the data lines 1. In this case, the black matrixes 8 are only disposed between adjacent pixels, so the area of the black matrixes 8 is reduced, the modulation range of liquid crystal is increased, and transmittance is improved.

A liquid crystal panel according to another example of the present embodiment includes a color filter substrate, the array substrate of the second embodiment, and a liquid crystal layer between the color filter substrate and the array substrate.

Fourth Embodiment

The present embodiment of the present invention provides a method for manufacturing the array substrate as described above. The method comprises the following steps:

Step 101, forming a gate line, a data line, a thin film transistor on a base substrate, a gate electrode of the thin film transistor being connected to the gate line and a source electrode being connected to the data line;

Step 102, forming a second insulating layer on the base substrate on which the gate line, the data line, and the thin film transistor are formed;

Step 103, forming a plate-shaped electrode on the base substrate on which the second insulating layer is formed; and Step 104, forming a slit-shaped electrode on the base substrate on which the plate-shaped electrode is formed, the slit-shaped electrode cooperating with the plate-shaped electrode to form a multi-dimension electric field, wherein a first insulating layer is disposed between the slit-shaped electrode and the plate-shaped electrode.

The slit-shaped electrode is a pixel electrode, and the plate-shaped electrode is a common electrode; or the plate-shaped electrode is a pixel electrode, and the slit-shaped electrode is a common electrode. An end of the plate-shaped electrode covers the data line.

For example, the slit-shaped electrode comprises slits arranged in a constant interval.

The embodiment of the present invention further provides a method for manufacturing a color filter substrate. The method comprises the following step:

Step 201, forming black matrixes and color resin sheets on a base substrate, the black matrixes are disposed corresponding to the gate lines, the thin film transistors, and regions where the data lines are not formed and between adjacent pixels, of the array substrate.

It should be noted that, in the embodiment of the present invention, the method for manufacturing the above described color filter substrate has various examples, e.g., by first forming the color resin sheets and then forming the black matrixes, or first forming the black matrixes and then forming the color resin sheets. The present embodiment is not limited thereto.

The black matrixes of the color filter substrate define a plurality of sub-pixel regions, and each sub-pixel region includes a color resin sheet such as a red, green, and blue resin sheet, and thereby obtaining red, green, and blue (RGB) sub-pixels, respectively. The sub-pixel regions of the color filter substrate correspond to the sub-pixel regions of the array substrate.

The array substrate is disposed to face the color filter substrate so as to form a liquid crystal cell together. The liquid crystal cell is filled with liquid crystal material, so as to obtain a liquid crystal panel. In some examples, the liquid crystal display further includes a backlight source for supplying light to the liquid crystal panel.

Various modifications can be made for the embodiments of the present invention; for example, the plate-shaped electrodes may be common electrodes and the slit-shaped electrodes may be pixel electrodes, as long as a multi-dimension field is formed therebetween. Further, alternatively, the electrodes covering the data lines may not be formed after the gate lines, the gate electrodes and the thin film transistors are formed, and for example, the gate lines and the gate electrodes are formed finally in a top-gate thin film transistor, as long as the thin film transistors can be driven normally, the data lines are protected by an insulating material, and the multi-dimension electric field can be formed.

An embodiment of the present invention further provides a display device, such as, liquid crystal display, liquid crystal TV, electronic paper, digital photo frame, etc., which comprises any one of the array substrates described in the above embodiments. When the display device is for example a liquid crystal display, it includes a liquid crystal panel including an array substrate, a color filter substrate, and a liquid crystal layer between the array substrate and the color filter substrate.

It should be noted that the above description is only for the purpose of explaining the solution of the invention but not for a limitation, although the invention has been described in detail with reference to the preferred embodiments, those skilled in the art should understand that change and alternation can be made in the solutions of the invention without depart from the spirit and scope of the invention.

The invention claimed is:

1. A display device, comprising an array substrate, wherein the array substrate comprises:
a base substrate,
a gate line disposed on the base substrate,
a data line disposed perpendicular to the gate line, and
a pixel region defined by the gate line intersecting the data line, in which a thin film transistor, a pixel electrode, and a common electrode which cooperates with the pixel electrodes to form a multi-dimension electric field are disposed,
wherein the pixel electrode is a plate-shaped electrode and the common electrode is a slit-shaped electrode, and a first insulating layer is disposed between the common electrode and the pixel electrode, and
wherein an end of the plate-shaped electrode overlays the data line, and a second insulating layer is disposed between a layer of the plate-shaped electrode and a layer of the data line
wherein the display device is a liquid crystal display, and further comprises a color filter substrate,
wherein the color filter substrate comprises black matrixes and color resin sheet formed between the black matrixes, on the base substrate, the black matrixes are disposed corresponding to the gate line, the thin film transistor, and regions where the data line is not formed and between adjacent pixels, of the array substrate, the black matrixes are not disposed on regions where the data line is formed.

2. The display device according to claim 1, wherein the second insulating layer is a resin layer.

3. The display device according to claim 1, wherein the slit-shaped electrode comprises slits arranged in a constant interval.

* * * * *